US010555350B2

(12) United States Patent
Wen et al.

(10) Patent No.: US 10,555,350 B2
(45) Date of Patent: Feb. 4, 2020

(54) BLUETOOTH CONNECTION ESTABLISHING METHOD

(71) Applicant: Realtek Semiconductor Corporation, Hsinchu (TW)

(72) Inventors: Bo Wen, SuZhou (CN); Yu-Hsuan Liu, Hsinchu (TW); Wei-Feng Mao, SuZhou (CN)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 16/158,761

(22) Filed: Oct. 12, 2018

(65) Prior Publication Data

US 2019/0116621 A1 Apr. 18, 2019

(30) Foreign Application Priority Data

Oct. 13, 2017 (CN) .......................... 2017 1 0951237

(51) Int. Cl.
*H04W 76/10* (2018.01)
*H04W 8/00* (2009.01)
*H04W 4/80* (2018.01)
*H04W 74/04* (2009.01)
*H04W 48/10* (2009.01)
*H04W 88/06* (2009.01)
*H04W 84/18* (2009.01)

(52) U.S. Cl.
CPC ............. *H04W 76/10* (2018.02); *H04W 4/80* (2018.02); *H04W 8/005* (2013.01); *H04W 48/10* (2013.01); *H04W 74/04* (2013.01); *H04W 84/18* (2013.01); *H04W 88/06* (2013.01)

(58) Field of Classification Search
CPC .............................. H04W 76/10; H04W 8/005
See application file for complete search history.

(56) References Cited

U.S. PATENT DOCUMENTS

| | | | | |
|---|---|---|---|---|
| 2003/0027526 A1* | 2/2003 | Hillyard | ................ | H04W 8/005 455/41.1 |
| 2005/0036475 A1* | 2/2005 | Nishiyama | ............ | H04W 72/10 370/347 |
| 2005/0068934 A1* | 3/2005 | Sakoda | .................. | H04W 48/08 370/350 |
| 2007/0165589 A1* | 7/2007 | Sakoda | .................. | H04W 48/08 370/345 |
| 2010/0290421 A1* | 11/2010 | Morioka | ............... | H04W 84/18 370/329 |
| 2017/0265101 A1* | 9/2017 | Ben-Shachar | .......... | H04W 4/80 |
| 2017/0351630 A1* | 12/2017 | Li | ........................ | G06F 13/4027 |

\* cited by examiner

*Primary Examiner* — Wen W Huang
(74) *Attorney, Agent, or Firm* — Locke Lord LLP; Tim Tingkang Xia, Esq.

(57) ABSTRACT

A Bluetooth connection establishing method that includes the steps outlined below is provided. A new device connection period of a device to be connected is determined by a master device. The master device determines a plurality of connected devices connected to the master device. A minimum device connection period of the device connection period of the connected devices is determined. A minimum time window corresponding to the minimum device connection period is selected and anchor points of the connected devices within the minimum time window are determined. A maximum available time window is selected from the available time windows and an available time spot within the maximum available time window is selected as the new anchor point of the device to be connected.

7 Claims, 3 Drawing Sheets

BLUETOOTH CONNECTION ESTABLISHING METHOD

CROSS-REFERENCE TO RELATED APPLICATION

This application claims priority to China Application Serial Number 201710951237.1, filed on Oct. 13, 2017, which is herein incorporated by reference.

BACKGROUND

Field of Invention

The present invention relates to a wireless network transmission technology. More particularly, the present invention relates to a Bluetooth connection establishing method.

Description of Related Art

Bluetooth is a wireless transmission technology standard for allowing mobile devices to exchange data within a short distance. When Bluetooth technology is used, a master device and the slave devices may be connected in a time-division manner. As a result, when more than two slave devices are simultaneously connected to the master device, a conflict may occur. When such conflict occurs, some of the slave devices are not able to be connected to the master device, while the connection(s) of some of the already connected slave devices may be interrupted.

Accordingly, what is needed is a Bluetooth connection establishing method for addressing the abovementioned issues.

SUMMARY

The invention provides a Bluetooth connection establishing method that includes the steps outlined below. A new device connection period of a device to be connected is determined by a master device. The master device determines a plurality of connected devices connected to the master device, wherein each connected device has a device connection period, and the device connection period and the new device connection period are directly proportional having a proportionality constant that is an integer. A minimum device connection period of the device connection period of the connected devices is determined. A minimum time window corresponding to the minimum device connection period is selected and anchor points of the connected devices within the minimum time window are determined. The minimum time window is divided into available time windows based on the anchor points. A maximum available time window is selected from the available time windows and an available time spot within the maximum available time window is selected as the new anchor point of the device to be connected.

These and other features, aspects, and advantages of the present invention will become better understood with reference to the following description and appended claims.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
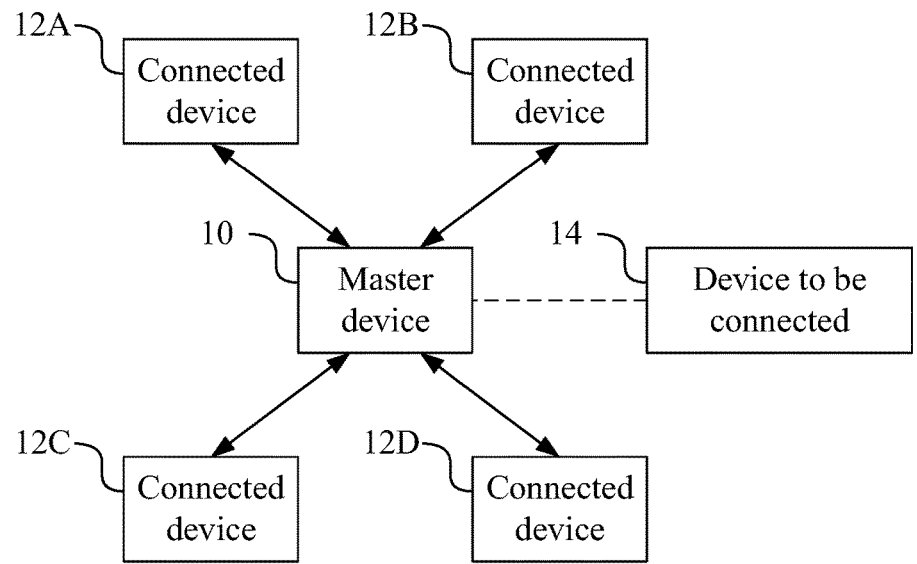
FIG. 1 is a diagram of a wireless network system in an embodiment of the present invention.

Reference will now be made in detail to the present embodiments of the invention, examples of which are illustrated in the accompanying drawings. Wherever possible, the same reference numbers are used in the drawings and the description to refer to the same or like parts.

Reference is now made to FIG. 1. FIG. 1 is a diagram of a wireless network system 1 in an embodiment of the present invention. The wireless network system 1 includes a master device 10, four connected devices 12A-12D that are already wirelessly connected to the master device 10 and a device to be connected 14.

In an embodiment, the device connection in the wireless network system 1 is performed in the form of Bluetooth. Since the devices are connected in a time-division manner when Bluetooth technology is used, the anchor points of the connected devices 12A-12D are preferably separated from each other to avoid the conflict generated when the multiple devices simultaneously communicate with the master device 10, in which when the conflict occurs, part of the slave devices are not able to connect to the master device, while part of the connected slave devices may be interrupted.

Figure 2:
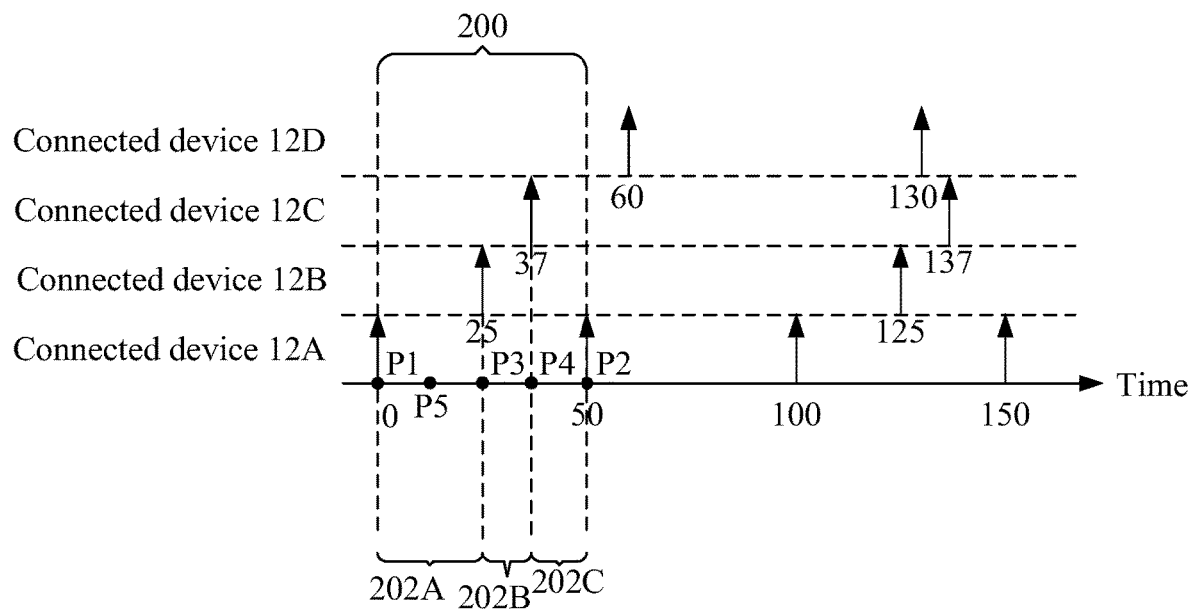
FIG. 2 is a timing diagram of the anchor points of the connected devices connected to the master device in an embodiment of the present invention.

Reference is now made to FIG. 2 at the same time. FIG. 2 is a timing diagram of the anchor points of the connected devices 12A-12D connected to the master device 10 in an embodiment of the present invention.

For example, the device connection periods of the connected devices 12A, 12B, 12C and 12D are 50, 100, 100 and 70 time unit. The anchor points for the connected device 12A on the time axis are located at 0, 50, 150 time unit, etc. The anchor points for the connected device 12B are located at 25, 125 time unit, etc. The anchor points for the connected device 12C are located at 37, 137 time unit, etc. The anchor points for the connected device 12D are located at 60, 130 time unit, etc.

As a result, the anchor points of the connected devices 12A-12D are separated from each other. The conflict generated when the multiple devices simultaneously communicate with the master device 10 is avoided.

Figure 3:
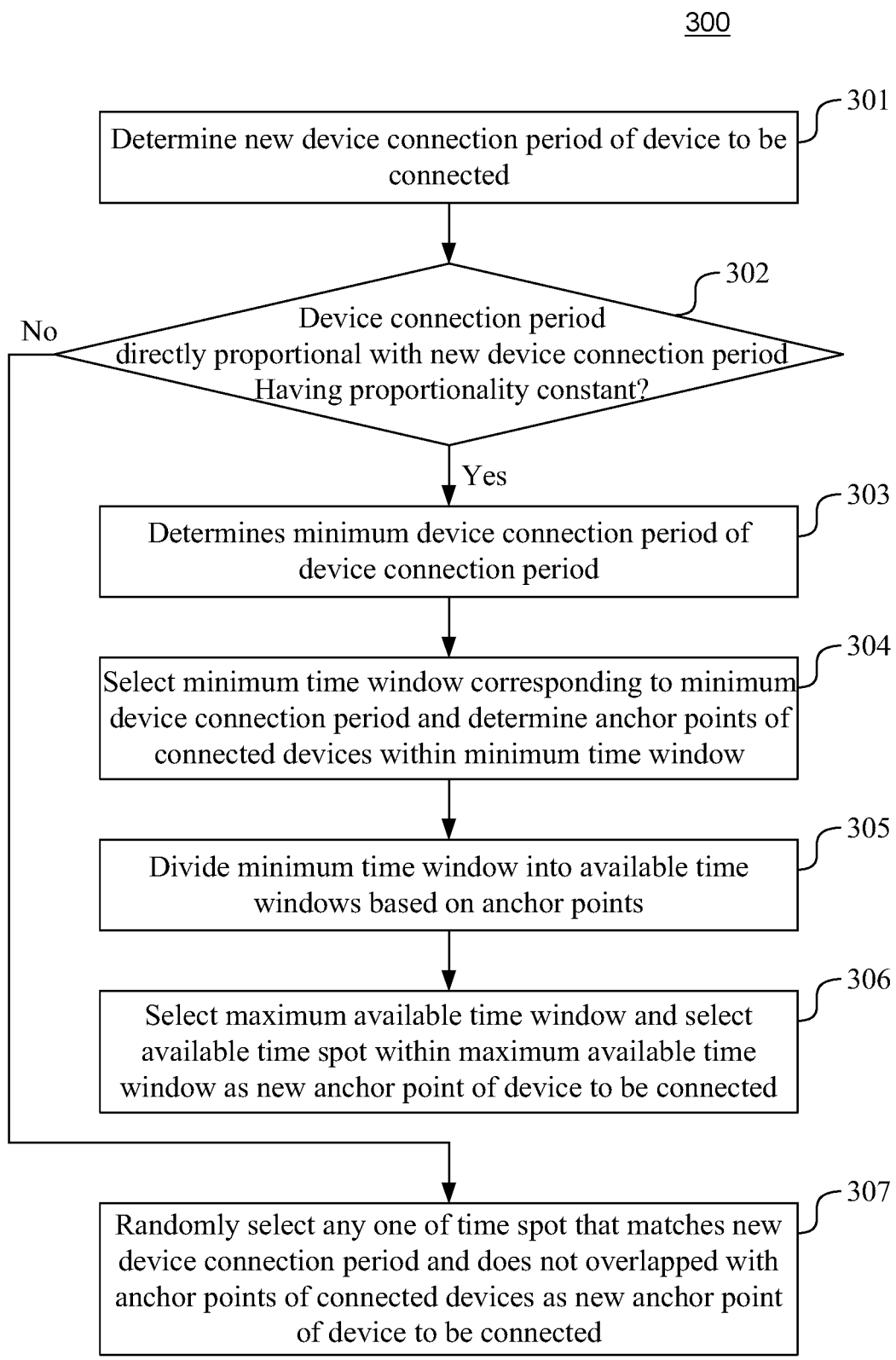
FIG. 3 is a flow chart of a Bluetooth connection establishing method in an embodiment of the present invention.

Reference is now made to FIG. 2 and FIG. 3 at the same time. FIG. 3 is a flow chart of a Bluetooth connection establishing method 300 in an embodiment of the present invention. In an embodiment, the Bluetooth connection establishing method 300 can be used to establish the connection between the master device 10 and the device to be connected 14 in the form of Bluetooth.

The Bluetooth connection establishing method 300 used in the wireless network system 1 is described in detail in accompany with FIG. 2 and FIG. 3. More specifically, the detail of the Bluetooth connection establishing method 300 for determining the anchor points of the device to be connected 14 under the condition that the connected devices 12A-12D are already connected to the master device 10 to further establish the connection therebetween is described in the following paragraphs in accompany with FIG. 2 and FIG. 3.

The Bluetooth connection establishing method 300 includes the steps outlined below. (The steps are not recited in the sequence in which the steps are performed. That is, unless the sequence of the steps is expressly indicated, the sequence of the steps is interchangeable, and all or part of the steps may be simultaneously, partially simultaneously, or sequentially performed).

In step 301, the master device 10 determines the new device connection period of the device to be connected 14. In different embodiments, the master device 10 can determine the new device connection period of the device to be connected 14 by using different algorithms. The new device connection period can be such as, but not limited to 50 time unit.

In step 302, the master device 10 determines that whether there is the connected devices 12A-12D connected to the master device 10 and having the device connection period that is directly proportional with the new device connection period (i.e. 50 time unit), having a proportionality constant that is an integer.

In an embodiment, when none of the connected devices 12A-12D connected to the master device 10 has a device connection period directly proportional with the new device connection period having a proportionality constant that is an integer, the flow directly goes to step 307. The master device 10 randomly selects any one of a time spot that matches the new device connection period and does not overlapped with the anchor points of the connected devices 12A-12D as the new anchor point of the device to be connected 14.

Taking the condition described above as an example, the device connection periods of 50, 100 and 100 time unit of the connected devices 12A-12C connected to the master device 10 are directly proportional to the new device connection period. The device connection period of 70 time unit of the connected device 12D is not directly proportional to the new device connection period.

In step 303, the master device 10 further determines a minimum device connection period of the device connection period of the connected devices. For example, the device connection period of the connected device 12A is smaller than the device connection periods of the connected devices 12B and 12C. As a result, the minimum device connection period is 50 time unit.

In step 304, the master device 10 selects the minimum time window 200 corresponding to the minimum device connection period and determines anchor points P1-P4 of the connected devices 12A-12C within the minimum time window 200.

Since the device connection period of the connected device 12A is the minimum device connection period, the time period between each two of the anchor points of the connected device 12A is qualified to be the minimum time window. In an embodiment, the master device 10 preferably selects the qualified time period closest to the current time spot as the minimum time window. For example, if the current time spot is at 10 time unit, as illustrated in FIG. 2, the master device 10 selects the minimum time window 200 between the 0 time unit to 50 time unit.

LOOM The master device 10 further determines that the anchor points P1 and P2 of the connected device 12A within the minimum time window 200 are at 0 time unit to 50 time unit, which are the boundaries of the minimum time window 200. The anchor points P3 of the connected device 12B within the minimum time window 200 is at 25 time unit. The anchor points P4 of the connected device 12C within the minimum time window 200 is at 37 time unit.

In step 305, the master device 10 divides the minimum time window 200 into available time windows 202A, 202B and 202C based on the anchor points P1-P4.

As illustrated in FIG. 2, the minimum time window 200 are divided into the available time window 202A between the anchor points P1 and P3 and having time length of 25 time units, the available time window 202B between the anchor points P3 and P4 and having time length of 12 time units, and the available time window 202C between the anchor points P4 and P2 and having time length of 13 time units.

In step 306, the master device 10 selects a maximum available time window from the available time windows 202A-202C, which is the available time window 202A having the time length of 25 time units, and selects an available time spot P5 within the maximum available time window 202A as the new anchor point of the device to be connected 14.

In an embodiment, the master device 10 selects a middle time spot of the maximum available time window 202A (the middle time spot between points P1 and P3) as the new anchor point.

In an embodiment, when the middle time spot is not at a location corresponding to an integer time unit, the master device 10 can select a point having the integer time unit that is closest to the middle point by using the method of round down, round up or round off. For example, the middle point of the anchor point P1 (0 time unit) and the anchor point P3 (25 time unit) can be selected as 12 by using the method of round down.

The Bluetooth connection establishing method 300 can calculate the minimum device connection period among the connected devices 12A-12D directly proportional with the new device connection period having a proportionality constant that is an integer under the condition that the master device 10 is already connected with the connected devices 12A-12D. Further, the Bluetooth connection establishing method 300 can dispose the new anchor point in the minimum time window corresponding to the minimum device connection period. Not only the new anchor point does not conflict with the anchor points of the connected devices, but also the time window can be used efficiently.

Figure 4:
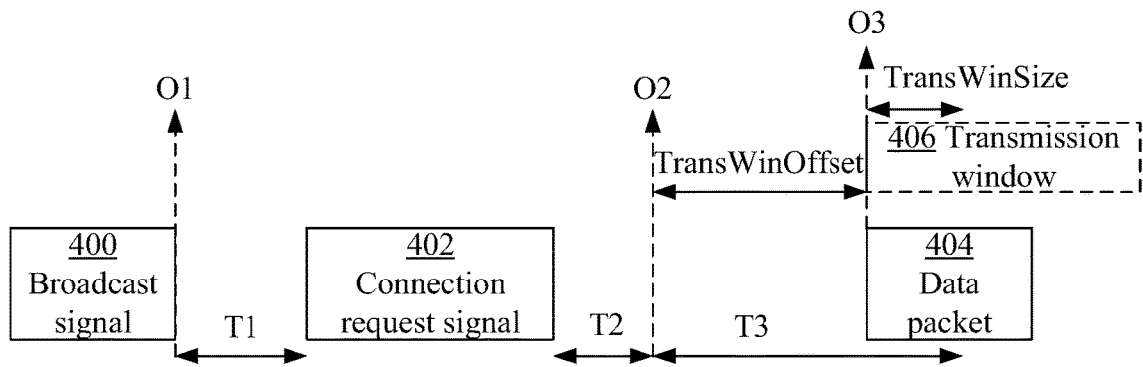
FIG. 4 is a timing diagram of the signal transmission during the procedure of the connection establishment between the master device and the device to be connected in FIG. 1 in an embodiment of the present invention.

Reference is now made to FIG. 4. FIG. 4 is a timing diagram of the signal transmission during the procedure of the connection establishment between the master device 10 and the device to be connected 14 in FIG. 1 in an embodiment of the present invention.

The device to be connected 14 generates a broadcast signal 400 such that the master device 10 receives the broadcast signal 400 at a current time spot O1 to execute the Bluetooth connection establishing method 300 in FIG. 3 to generate the new anchor point of the device to be connected 14. After a time period of T1, the master device 10 generates a connection request signal 402 to the device to be connected 14 such that the device to be connected 14 connects to the master device 10 according to the connection request signal 402. The information of the new anchor point selected in step 306 of the Bluetooth connection establishing method 300 is included in the connection request signal 402.

The master device 10 sets a time spot after transmitting the connection request signal 402 for a time period T2 as the initial connection time spot O2. The time period T2 is a fixed value in the spec of the Bluetooth protocol, such as, but not limited to 2 time units. The master device 10 sets a time spot after the initial connection time spot O2 for an offset time amount T3 as the first new anchor point O3 to actually transmit the data packet 404 to the device to be connected 14 at the new anchor point O3.

In an embodiment, the real transmission time spot of the data packet 404, i.e. the location of the new anchor point O3, has to be within a transmission window 406 set according to the agreement between the master device 10 and the under-connected ion device 14. As a result, corresponding to the duration before the transmission window 406 and the duration within the transmission window 406, the offset time amount T3 includes a transmission window displacing time amount TransWinOffset and a time amount TransWinSize within the transmission window 406. In an embodiment, in order to simplify the calculation, the time amount TransWinSize within the transmission window 406 is selected as 0 such that the new anchor point O3 corresponds to the very beginning of the transmission window 406. However, the present invention is not limited thereto.

The master device 10 can transmit the values of the transmission window displacing time amount TransWinOffset and the time amount TransWinSize through the transmission of the connection request signal 402 such that the device to be connected 14 is informed about the location of the new anchor point O3 relative to the location of the initial connection time spot O2 accordingly to establish the connection with the master device 10.

Figure 5:
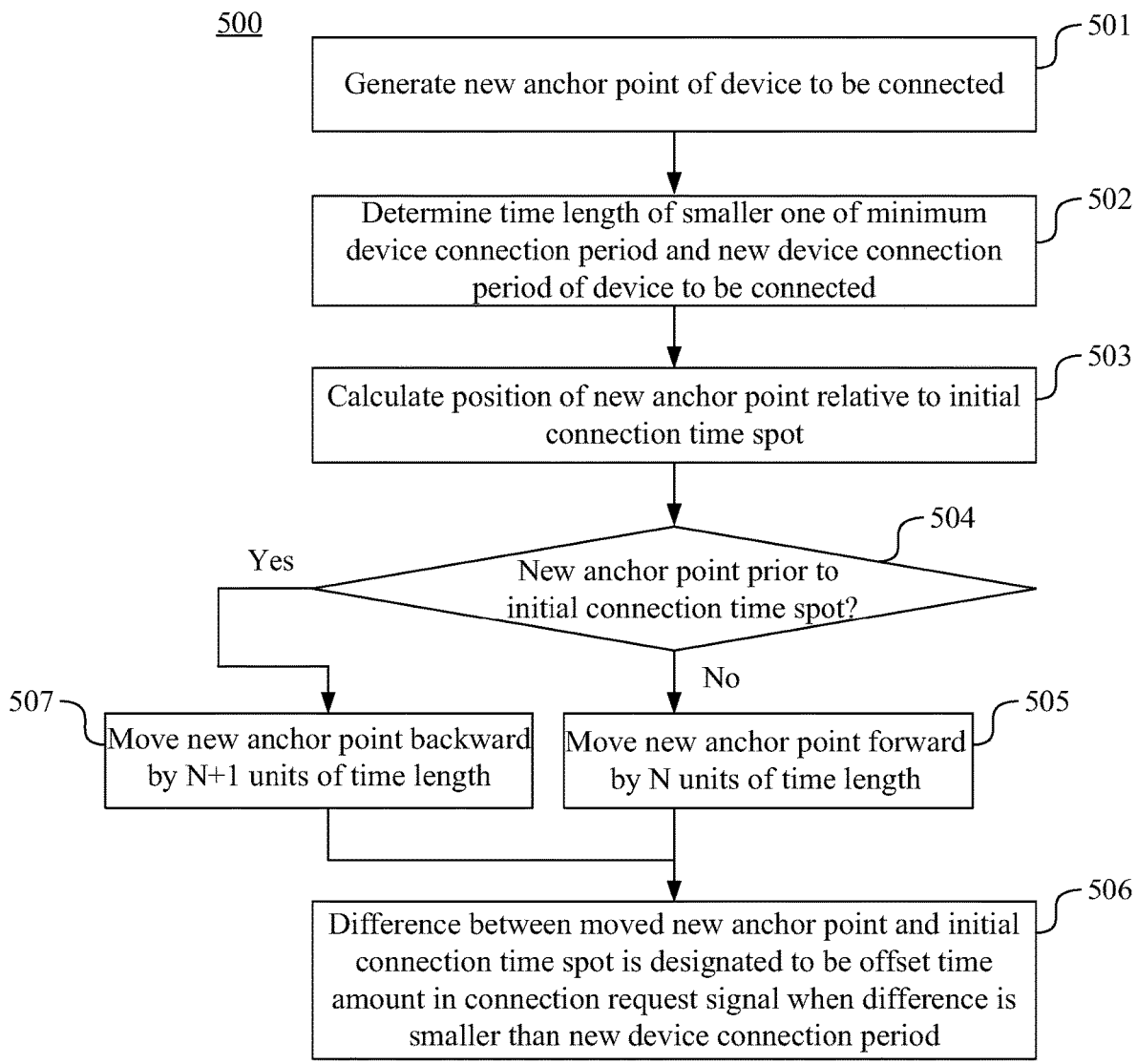
FIG. 5 is a flow chart of a Bluetooth connection establishing method in an embodiment of the present invention.

Reference is now made to FIG. 4 and FIG. 5 at the same time. FIG. 5 is a flow chart of a Bluetooth connection establishing method 500 in an embodiment of the present invention. In an embodiment, the Bluetooth connection establishing method 500 can be used to calculate the required transmission window displacing time amount TransWinOffset, such that the master device 10 informs the device to be connected 14 about the location of the new anchor point O3 through the transmission of the connection request signal 402.

The Bluetooth connection establishing method 500 includes the steps outlined below. (The steps are not recited in the sequence in which the steps are performed. That is, unless the sequence of the steps is expressly indicated, the sequence of the steps is interchangeable, and all or part of the steps may be simultaneously, partially simultaneously, or sequentially performed).

In step 501, the master device 10 generates the new anchor point O3 (e.g. at 72 time unit) of the device to be connected 14.

In step 502, the master device 10 determines a time length of a smaller one of the minimum device connection period (50 time units) and the new device connection period (50 time units) of the device to be connected 14. Since the values of the two periods are the same, the time length is determined to be 50 time units.

In step 503, the master device 10 calculates a position of the new anchor point O3 relative to the initial connection time spot O2.

Based on the location of the current time spot O1 (10 time unit), the master device 10 calculates the position of the new anchor point O3 relative to the initial connection time spot O2 (2 time units behind the current time spot O1). The difference D1 between the new anchor point O3 and the current time spot O1 is therefore 72−10=62 time units.

By determining the difference D1 is larger than 2 time units, the master device 10 can obtain the position of the new anchor point O3 relative to the initial connection time spot O2.

In step 504, the master device 10 determines whether the new anchor point O3 is prior to the initial connection time spot O2. Since the difference D1 is 62 time units, which is larger than 2 time units, the master device 10 determines that the new anchor point O3 is not prior to the initial connection time spot O2.

In step 505, when the new anchor point O3 is behind the initial connection time spot O2 and is distanced by N to N+1 units of time length, the new anchor point is moved forward by N units of time length.

Since the time length calculated in step 502 is 50 time units, the relation of the new anchor point O3 relative to the initial connection time spot O2 is 72−12=62=1×50+12. The new anchor point O3 is determined to be behind the initial connection time spot O2 by 1 to 2 units of time length. The master device 10 thus moves the new anchor point O3 forward by 1 unit of time length, which is at the position of 22 time unit.

In step 506, the master device 10 calculates the difference Diff between the moved new anchor point O3 and the initial connection time spot O2 (22−10−2=10), such that the difference Diff is designated to be the offset time amount T3 in the connection request signal 402 when the difference is smaller than the new device connection period (50 time units).

Since the value of the time amount TransWinSize is set to be 0, the value of the transmission window displacing time amount TransWinOffset is set to be 10.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A method for establishing Bluetooth connection, the method comprising:
   determining, by a master device, a new device connection period for a device to be connected;
   determining, by the master device, a plurality of connected devices connected to the master device, wherein each connected device has a device connection period defined by a time interval of two adjacent anchor points of the connected device, and determining, by the master device, whether one of the device connection periods and the new device connection period are directly proportional having a proportionality constant that is an integer;
   Determining, by the master device, a minimum device connection period of the device connection periods of the connected devices when the master device determines that one of the device connection periods is directly proportional to the new device connection period with the proportionality constant;
   selecting a minimum time window corresponding to the minimum device connection period and determining a plurality of anchor points of the connected devices within the minimum time window;
   dividing the minimum time window into a plurality of available time windows based on the plurality of anchor points by the master device; and selecting a maximum available time window from the available time windows and selecting, by the master device, an available time spot within the maximum available time window as the new anchor point of the device to be connected.

2. The method for establishing Bluetooth connection of claim 1, wherein the new anchor point is a middle time spot of the maximum available time window.

3. The method for establishing Bluetooth connection of claim 1, further comprising:
when the master device determines that none of the connected devices connected to the master device has a device connection period proportional to the new device connection period with the integer ratio, the master device randomly selects any one of a time spot that matches the new device connection period and does not overlapped with the plurality of anchor points of the connected devices as the new anchor point of the device to be connected.

4. The method for establishing Bluetooth connection of claim 1, further comprising:
receiving a broadcast signal generated by the device to be connected by the master device; and
generating a connection request signal to the device to be connected according to the broadcast signal by the master device such that the device to be connected connects to the master device according to the connection request signal, in which the connection request signal comprises information of the new anchor point.

5. The method for establishing Bluetooth connection of claim 4, further comprising:
determining a time length of a smaller one of the minimum device connection period and the new device connection period;
calculating a position of the new anchor point relative to an initial connection time spot after the generation of connection request signal;
when the new anchor point is prior to the initial connection time spot, the new anchor point is moved backward by a unit of the time length by the master device; and
when the new anchor point is behind the initial connection time spot and is distanced by N to N+1 units of the time length, the new anchor point is moved forward by N units of the time length.

6. The method for establishing Bluetooth connection of claim 5, further comprising:
calculating a difference between the moved new anchor point and the initial connection time spot by the master device such that the difference is designated to be an offset time amount in the connection request signal when the difference is smaller than the new device connection period.

7. The method for establishing Bluetooth connection of claim 6, wherein the offset time amount comprises a transmission window displacing time amount and a time amount within a transmission window.

* * * * *